UNITED STATES PATENT OFFICE 2,095,107

METHOD OF DEPOSITING RUBBER

Andrew Szegvari, Akron, Ohio, assignor to American Anode, Inc., Akron, Ohio, a corporation of Delaware No Drawing. Original application October 29, 1930, Serial No. 492,094. Divided and this application January 31, 1935, Serial No. 4,310

9 Claims. (Cl. 18—41)

This invention relates to the art of rubber manufacture, and particularly to the production of raised designs, lettering, etc., of rubber, as well as rubber coatings over portions only of objects.

It has heretofore been proposed to manufacture rubber articles or produce rubber coatings by dipping a form successively in a liquid coagulant and in liquid latex, the film of coagulant remaining on the form causing the coagulation of the subsequently applied latex. This previously known process, however, has not been adapted to the production of discontinuous coatings, or coatings possessing a variable thickness.

An object of this invention is accordingly the production of dipped rubber products of varying thickness. Another object is the production of rubber deposits or coatings over only the desired limited portion of the surface of a base or form. A further object is the production of decorative designs, lettering, etc., on rubber articles. Other objects will be evident from the following description of the invention.

The invention is practiced by providing a base or form with a film of coagulant over a portion only of its surface, and then bringing the coagulant-coated surfaces in association with a body of a coagulable aqueous dispersion of rubber or like substances. The coagulant may be applied by brushing, spraying, by transferring from another surface, etc., and may be associated with the aqueous dispersion by immersion therein, or by flowing or spraying the dispersion over the coagulant-treated surface.

Where an object is to be provided with a permanent coating of rubber over a portion only of its surface, an adhesive substance is preferably applied to that portion of its surface either before the coagulant is applied or simultaneously therewith. For example, 10 parts of glacial acetic acid is cautiously stirred into a solution of 15 parts of an adhesive, artificial rubber isomer in 100 parts benzol. The adhesive rubber isomers disclosed in the patent to Geer, No. 1,617,588, of Feb. 15, 1927, are particularly suitable. A plating rack for supporting metallic articles while they are electroplated has the areas which are to remain bare and conduct the current masked with paper or other suitable material, whereupon the remainder of the surface is coated with a thin layer of the above solution by spraying. The masks are removed and the rack is dipped in a vulcanizable latex until the desired thickness of rubber is coagulated. The excess uncoagulated latex is washed off the untreated portions of the rack and the deposited rubber is washed in hot running water to remove water-soluble substances, including the coagulant. The adhesive rubber isomer, however, being insoluble in water, remains between the rubber and metal as a thin film which causes the rubber to adhere permanently to the metal after vulcanization.

Paper, wood, or other fibrous material is provided with a decorative coating over a portion of its surface by printing on the surface with a thick rubber cement containing approximately 5% of acetic acid, or an equivalent amount of any of the well known coagulants, such as those hereinafter mentioned, in solution in water or an organic solvent such as alcohol, ether, acetone, or an ester. After the cement has partially dried the fibrous material is immersed in latex which is coagulated on the treated portion of the surface by contact with the acid-containing cement. The uncoagulated latex is washed off the untreated surfaces, for example, by successive treatment with a solution of ½% of soap and ½% ammonia, a solution containing ½% ammonia, and then ordinary tap-water. Such decorative coatings may possess almost any desired outline from the simplest figures to the most complex, and may even include lettering, for the outlines of the coatings are very sharp and distinct.

Rubber articles may be provided with raised or embossed lettering or other designs, which may be in contrasting colors from the rubber base, by applying a coagulant to a suitable base by printing it thereon, spraying through a stencil, etc. For example, a felt pad is saturated with a solution of calcium nitrate in acetone or methanol, and a rubber stamp with a surface of the desired configuration is moistened with the coagulant, which is transferred to a sheet of calendered paper by a printing operation. The paper is thereupon immersed in a colored latex. After a short time the paper is removed and the excess uncoagulated latex washed off as described in the preceding paragraph. The rubber letters or other designs are transferred to the rubber article, which is preferably unvulcanized, by pressing the side of the paper which carries the rubber deposits firmly against the article and then stripping off the paper. The rubber may then be vulcanized as usual, preferably in open steam or dry heat. It should be noted that in this process the lettering is twice transferred, once from the stamp to the paper and once from the paper to the rubber article, hence the letters in the stamp should not be reversed as in ordinary type, but should be made exactly as they are to appear on the finished article. If desired, different letters or different portions of a design may be produced in different colors and separately transferred to the rubber article in the predetermined location.

It is likewise possible to produce raised designs or lettering directly on the rubber by applying the coagulant directly thereto and immersing the rubber article itself in the latex. The lettering may even be produced on a sheet of unvulcanized rubber which is then cut out in the form of a medallion or manufacturer's label and affixed to the rubber article as a complete unit. This process is also applicable to the transfer of rubber letters to the surfaces of other substances such as metal, wood, paper, etc., an adhesive being preferably employed in this modification.

In the examples given above certain specific coagulants have been described, but it is to be understood that other coagulants may be substituted therefor. For example, salts of polyvalent metals, such as magnesium chloride, calcium chloride, calcium nitrate, calcium lactate, zinc chloride, aluminum chloride, etc., may be employed, either alone or together with a free acid, in solution in water or an organic solvent such as alcohol, ether, acetone, an ester, etc. The coagulant may consist of a free acid such as formic, acetic, citric, lactic, hydrochloric, etc., in an appropriate solvent or diluent. The coagulant may contain colloids, high-boiling solvents, wetting agents, etc., to modify its properties for particular uses.

The aqueous dispersion may be any natural or artificial dispersion of rubber or a like substance, including natural latices of caoutchouc and gutta-percha, artificial dispersions of crude rubber, synthetic rubber, reclaimed rubber, rubber isomers, etc. The dispersion may be concentrated, or vulcanized, or otherwise treated before it is used, and may contain pigments, softeners, vulcanizing agents, or other additions.

It is therefore to be understood that this invention is not limited to the examples enumerated above, which are merely illustrative of certain manners of carrying out my invention, but that numerous modifications may be introduced without exceeding the spirit and scope of the invention as defined in the appended claims.

This application is a division of my copending application Serial No. 492,094 filed October 29, 1930, which has matured into U. S. Patent No. 1,989,717, granted Feb. 5, 1935.

I claim:

1. The method of forming a rubber deposit which comprises applying to a deposition base a fluid rubber cement containing a liquid coagulant for latex, allowing the cement to dry at least partially, and applying latex to the treated deposition base.

2. A method of forming a rubber article comprising applying to a base a fluid organic solvent solution of rubber containing a latex coagulant and material which evaporates less readily than the rubber solvent and which is capable of effecting setting of the composition to a non-flowing gel on evaporation of a portion of the rubber solvent, allowing the volatile constituents of the composition to evaporate at least until setting occurs, and applying latex to the thus treated base.

3. A method of forming a rubber article comprising applying to a base a fluid organic solvent solution of rubber containing an aqueous solution of a latex coagulant, allowing the organic solvent to evaporate at least until the composition is set to a non-flowing gel, and applying latex to the thus treated base.

4. A method of forming a rubber article comprising associating a non-flowing rubber gel containing an aqueous solution of a latex coagulant distributed therethrough with a deposition base, and applying latex to the thus treated base.

5. A method of forming a rubber article comprising associating a non-flowing rubber gel containing an aqueous solution of a salt which is a latex coagulant with a deposition base, and applying latex to the thus treated base.

6. A method of forming a rubber article comprising associating a porous rubber layer containing a latex coagulant in the interstices thereof with a deposition base, and applying latex to the thus treated base.

7. A deposition form for the coagulation of latex thereon comprising a base and a coating on at least a portion of said base comprising a non-flowing rubber gel containing an aqueous solution of a latex coagulant distributed therethrough.

8. A deposition form for the coagulation of latex thereon comprising a base and a coating on at least a portion of said base comprising a porous rubber layer containing a latex coagulant in the interstices thereof.

9. A deposition form for the coagulation of latex thereon comprising a base and a coating on at least a portion of said base comprising a non-flowing rubber gel containing an aqueous solution of a salt which is a latex coagulant distributed therethrough.

ANDREW SZEGVARI.